(12) United States Patent
Etgen et al.

(10) Patent No.: US 9,071,570 B2
(45) Date of Patent: Jun. 30, 2015

(54) METHOD AND APPARATUS TO SELECT AND DELIVER PORTABLE PORTLETS

(75) Inventors: Michael Peter Etgen, Cary, NC (US); James Edward Fox, Apex, NC (US); Steven Michael Miller, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2409 days.

(21) Appl. No.: 11/094,092

(22) Filed: Mar. 30, 2005

(65) Prior Publication Data

US 2006/0230059 A1 Oct. 12, 2006

(51) Int. Cl.
H04L 29/08 (2006.01)

(52) U.S. Cl.
CPC .............. *H04L 67/02* (2013.01); *H04L 67/148* (2013.01); *H04L 67/142* (2013.01)

(58) Field of Classification Search
CPC ...... H04L 67/02; H04L 67/142; H04L 67/148
See application file for complete search history.

(56) References Cited

U.S. PATENT DOCUMENTS

| | | | | |
|---|---|---|---|---|
| 6,327,628 B1 | | 12/2001 | Anuff et al. | 709/311 |
| 7,024,451 B2 * | | 4/2006 | Jorgenson | 709/203 |
| 7,107,309 B1 * | | 9/2006 | Geddes et al. | 709/203 |
| 7,228,496 B2 * | | 6/2007 | Hamada | 715/255 |
| 7,367,014 B2 * | | 4/2008 | Griffin | 717/107 |
| 8,312,170 B2 * | | 11/2012 | Ng et al. | 709/246 |
| 2001/0025313 A1 * | | 9/2001 | Feng et al. | 709/226 |
| 2001/0034771 A1 | | 10/2001 | Hütsch et al. | 709/217 |
| 2002/0169852 A1 | | 11/2002 | Schaeck | 709/218 |
| 2003/0139935 A1 | | 7/2003 | Silverman | |
| 2003/0149722 A1 | | 8/2003 | Jolley et al. | |
| 2003/0167315 A1 * | | 9/2003 | Chowdhry et al. | 709/218 |
| 2003/0167332 A1 * | | 9/2003 | Kumar et al. | 709/227 |
| 2003/0187956 A1 * | | 10/2003 | Belt et al. | 709/219 |
| 2003/0188163 A1 | | 10/2003 | Fischer et al. | 713/170 |
| 2004/0001565 A1 | | 1/2004 | Jones et al. | 375/354 |
| 2004/0068554 A1 | | 4/2004 | Bales et al. | 709/218 |
| 2004/0090969 A1 | | 5/2004 | Jerrard-Dunne et al. | 370/395.54 |

(Continued)

FOREIGN PATENT DOCUMENTS

| | | |
|---|---|---|
| JP | 2003036197 A | 2/2003 |
| JP | 2005507122 A | 3/2005 |
| WO | 0223368 A1 | 2/2002 |

OTHER PUBLICATIONS

Fred et al., "The case for portlets", IBM Developerworks, Feb. 2003, pp. 1-7.

(Continued)

*Primary Examiner* — Krista Zele
*Assistant Examiner* — Matthew Lindsey
(74) *Attorney, Agent, or Firm* — Patents on Demand P.A.; Brian K. Buchheit; Scott M. Garrett

(57) ABSTRACT

A portlet may be selected from among one or more portlets rendered by an origin server. The origin server may have an object listening for pointer activity wherein a user event triggers selection of a portlet. The origin server, in response, may send state information of the portlet in the form of a key to a client, often operated by a user. Client may later send the key to a disjoint server, wherein the key is integrated into a portal containing services that the client subscribes to. Thus a persistent session may exist between the disjoint server and the origin server based on the user's preferences.

8 Claims, 4 Drawing Sheets

(56) References Cited

U.S. PATENT DOCUMENTS

| | | | | |
|---|---|---|---|---|
| 2004/0098451 | A1 | 5/2004 | Mayo | 709/203 |
| 2004/0122971 | A1 | 6/2004 | Joshi et al. | 709/236 |
| 2004/0133660 | A1 | 7/2004 | Junghuber et al. | 709/219 |
| 2004/0183831 | A1* | 9/2004 | Ritchy et al. | 345/762 |
| 2004/0199392 | A1 | 10/2004 | Khatri et al. | 704/277 |
| 2004/0205555 | A1 | 10/2004 | Hind et al. | 715/513 |
| 2004/0230901 | A1 | 11/2004 | Godwin et al. | |
| 2005/0021694 | A1* | 1/2005 | Yuan | 709/220 |
| 2005/0065913 | A1* | 3/2005 | Lillie et al. | 707/3 |
| 2005/0080906 | A1* | 4/2005 | Pedersen | 709/228 |
| 2005/0198393 | A1* | 9/2005 | Stutz et al. | 709/246 |

OTHER PUBLICATIONS

Shu et al., "Building JSR 168-Compliant Portlets with Sun Java Studio Enterprise", Sun Developers, May 2004, pp. 1-18. http://developers.sun.com/prodtech/portalserver/reference/techart/portlets.html.

Buckner et al., "Portlet Development Guide (Second Edition)", Websphere Portal Development, Mar. 2003, pp. 45-54. http://www3.software.ibm.com/ibmd1/pub/software/dw/wes/pdf/V42PortletDevelopmentGuide.pdf.

Philips, "Developing and Debugging Portlets Using the IBM Portal Toolkit Plug-In for WebSphere Studio Appliation Developer", IBM Developers, Oct. 2002.

* cited by examiner

METHOD AND APPARATUS TO SELECT AND DELIVER PORTABLE PORTLETS

BACKGROUND OF THE INVENTION

1. Technical Field

The present invention generally relates to hypertext portals and portlets. Specifically, the present invention provides a portlet data sharing system, method, and program product that allows increased flexibility and reusability in sharing data between portlets and portals.

2. Description of Related Art

A portal or portal program is a web-based or hypertext based application that provides personalization, content aggregation from different sources, provides formatting and other presentation layer features, and, optionally may provide a single sign-on as needed for accessing disparate web services. A portal server may be the combined software, hardware and client data that delivers data to users.

As the use of the Internet becomes more pervasive, better technology is constantly being developed for displaying web content. To this extent, portal servers have become the technology of choice in delivering web content to users. Typically, a portal server includes a portal program (e.g., WEBSPHERE from International Business Machines Corp. of Armonk, N.Y.), which arranges web content into a portal page containing one or more portlets.

Portlets are an encapsulation of content and functionality. They are reusable components that combine Web-based content, application functionality and access to resources. Portlets are assembled into portal pages which, in turn, make up a portal implementation. Portlets are similar to Windows applications in that they present their contents in a window-like display on a portal page. Like a Windows application, the portlet window has a title bar which contains controls, allowing the users to expand (maximize) and shrink (minimize) the application.

Each portlet includes a section of web content specified according to a user's preferences. For example, a user can establish his or her own portal page that has portlets for news, weather and sports. Thus a portlet window is the outward manifestation of the portlet program. The portlet program can obtain the desired web content from an appropriate content provider and aggregate the web content. Each portlet coordinates with the portal to generate markup (e.g. HTML) such that web content is displayed in the appropriate portlet windows or subwindows. This portal technology has lead to the explosion of personalized "home pages" for individual web users.

Developers have begun to apply the portlet technology for commercial applications. For example, a portal page can be used to customize a page for an employee, customer, supplier, etc. In these applications, data presented in the portlets is often related. For example, data in a "destination city" field of a travel portlet could be shared with a "target city" field of a weather portlet. In current implementations, a portlet can share data with another known portlet by using messaging or passing parameters. However, the portlet developer must have detailed knowledge of all participating portlets in order to implement the data sharing. Further, the decision of whether to share data, and what data to share is fixed when a portlet is developed. These limitations restrict the reusability and interoperability of portlets.

Prior art methods of sharing and aggregating information to a portal have included, among other protocols, Simple Object Access Protocol (SOAP). SOAP is a way for a program running in one kind of operating system to communicate with a program in the same or another kind of operating system by using preferably the Hypertext Transfer Protocol (HTTP) and its Extensible Markup Language (XML) as the mechanisms for information exchange. SOAP specifies how to encode an HTTP-header and an XML-file so that a program in one computer can call a program in another computer and pass it information. It also specifies how the called program can return a response.

The old ways of adding content may have included using an integrated development environment (IDE), i.e. a programming environment that has been packaged as an application program, typically consisting of a code editor, a compiler, a debugger, and a graphical user interface (GUI) builder. Even before that, integrating content from disparate source could often was a laborious process of editing HTML and adding CGI functionality. In any case, it was laborious, time-consuming, and required specialty knowledge in the semantics and formatting of esoteric languages. This was certainly not a task to be undertaken by the vast majority of people who surf the web for information.

Some progress was made in US Published Application 2002/0169852 A1, SYSTEM AND METHOD FOR DYNAMICALLY INTEGRATING REMOTE PORTLETS INTO PORTALS, IBM. The prior art invention had the laudable goal to provide a simplified procedure for installing, accessing and using remote portlets by portals. Although the prior art had shown a way wherein SOAP and other protocols could support picking portlets from a menu-like interface, and adding such portlets in no particular order to a portal—the prior art neglected to address the modern notion of ad hoc selection of actively rendered portlets at an originating page, and placing such portlets in an accretive manner in the exact tracts of portal window real estate that the user desired.

In view of the foregoing, there exists a need for a portlet data sharing system, method and program product. In particular, there exists a need for a system, method and program product that allows developers to define access to data within a portlet that can be shared with and via a disjoint server. Further, there exists a need for portlets that allow a user or developer to define the data sharing between portlets. These features provide portlets that are more flexible and reusable in various applications.

BRIEF SUMMARY OF THE INVENTION

The present invention provides a method, apparatus, and computer program product for selecting a portlet. Initially an origin server may render a portlet in response to a user or client's http (Hypertext Transfer Protocol) request. The portlet displayed as a portlet window, has a button or grabbable frame that is responsive to pointer actions or events. The user clicks on the button, and the origin server serializes the state of the portlet. The origin server stores the portlet state in a key and sends the key to the client.

Later, at the user's favorite portal, an embodiment of the invention may receive an http request, and render a portal window having at least an event trigger corresponding to a portion of the portal window. The portal receives the key with the attendant portlet state. The key serves as a way to persist the session between client and origin server, but by using the portal server (sometimes called a disjoint server) as a proxy to communicate the key to the origin server. The disjoint server renders the portlet in accordance with the key.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

It is understood that, as known in the art, the term "portlet" refers both to the visual sections of a portal page, as well as to the program code used to obtain and aggregate the content therein for display in the visual sections. Thus, a portlet should be understood to have at least two manifestations: (1) a visual portlet displayed as part of a portal page; (2) and a portlet program that includes the program code for obtaining the content displayed in the visual portlet.

Aggregation is the process of integrating content from different sources within a webpage.

One benefit of the embodiments of the invention is that the user actions to build and aggregate content into a portal are simplified. The simplification may come in the form that the user is allowed, with two browser windows displayed, to drag a portlet from one browser window to a second browser window (hosted by a receiving server), and assure that the new and possibly disjoint server that renders such a browser window, has repeated access to the portlet that may be hosted by another (possibly disjoint) server. In effect, a relatively permanent addition may be made with a simple drag and drop action.

Figure 1:
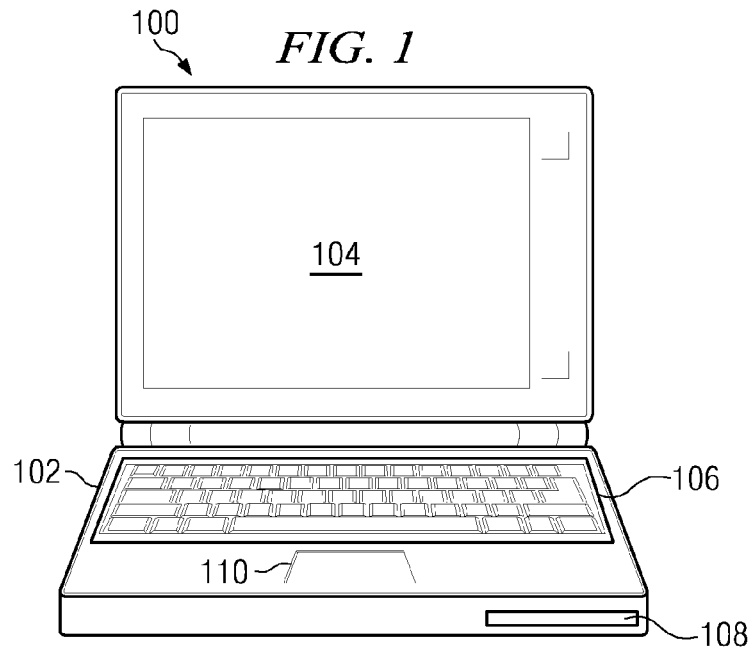
FIG. 1 is a generic computer system in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
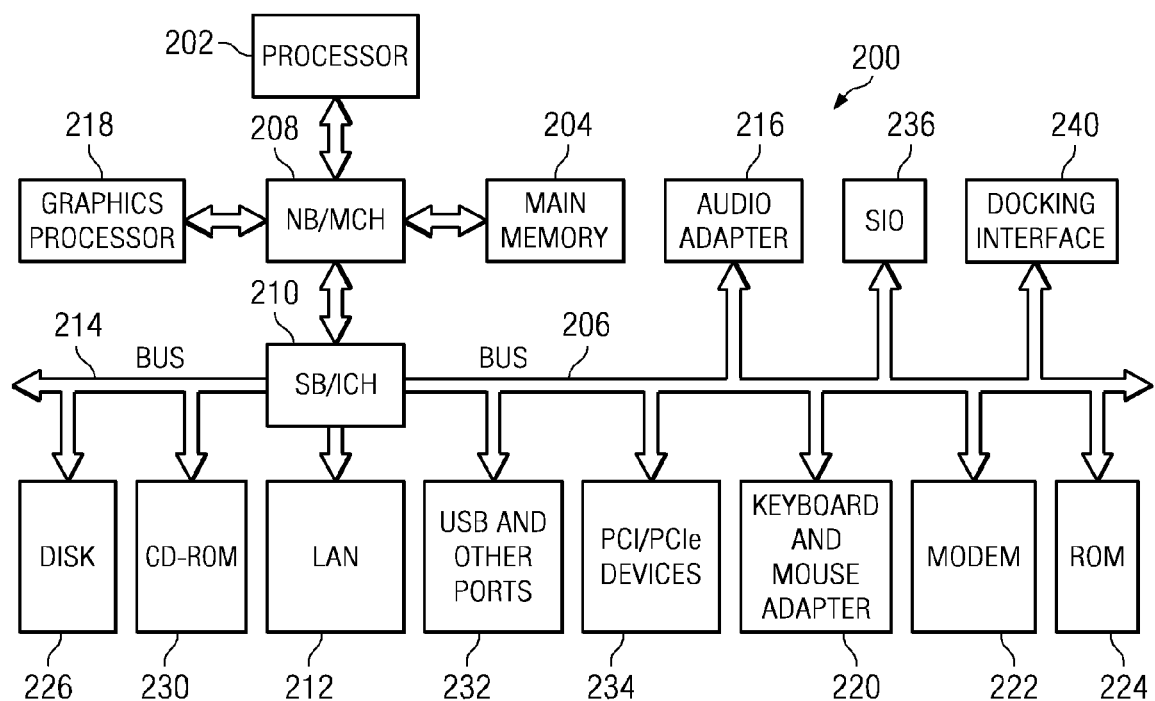
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a hub architecture including north bridge and memory controller hub (MCH) 208 and south bridge and input/output (I/O) controller hub (ICH) 210. Processor 202, main memory 204, and graphics processor 218 are connected to north bridge and memory controller hub 208. Graphics processor 218 may be connected to north bridge and memory controller hub 208 through an accelerated graphics port (AGP). In the depicted example, local area network (LAN) adapter 212 connects to south bridge and I/O controller hub 210. In contrast, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 are connected to south bridge and I/O controller hub 210 through bus 206 and bus 214. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 210. Docking interface 240 also may be coupled to the south bridge and I/O controller hub 210. Because data processing system 200 may be a mobile computing device, such as, for example, a laptop computer or handheld computer, docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include hard disk drive 226 and CD-ROM 230. In that case, the computer, to be properly called a client computer, includes some type of network communication interface, such as LAN adapter 212, modem 222, or the like. As another example, data processing system 200 may be a stand-alone system configured to be bootable without relying on some type of network communication interface, whether or not data processing system 200 comprises some type of network communication interface.

As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, ROM 224, hard disk drive 226, or in a peripheral device, such as CD-ROM 230.

Figure 3:
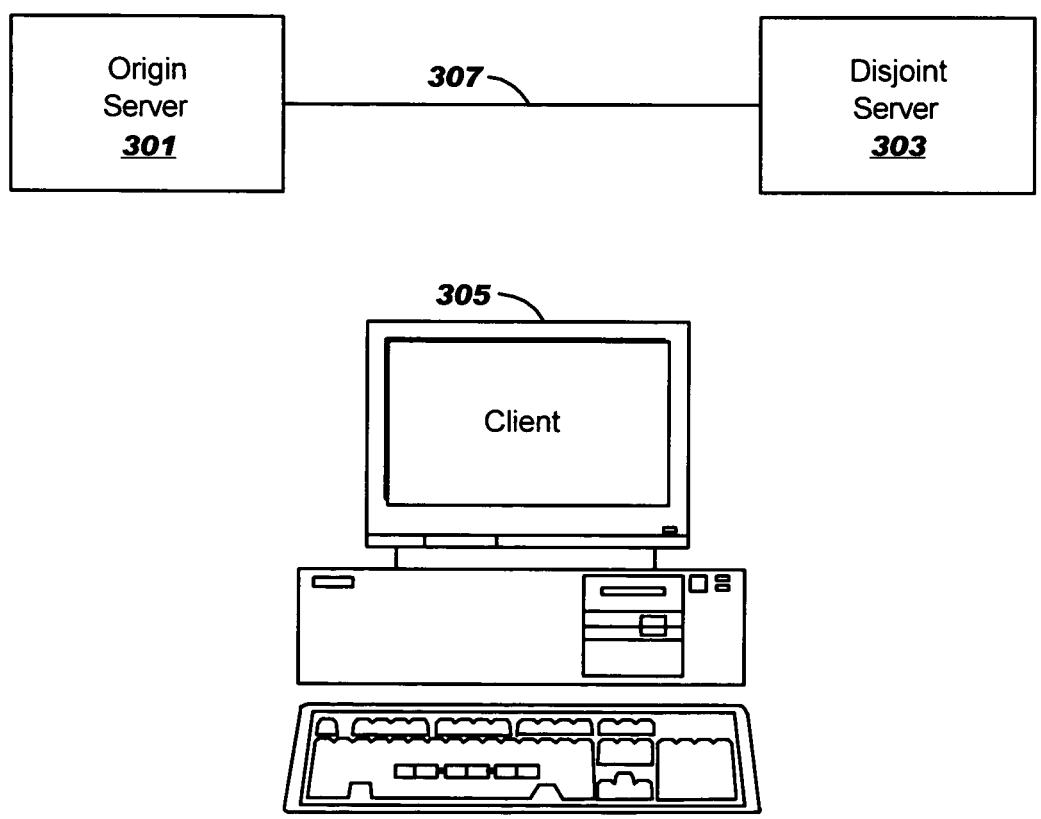
FIG. 3 is an architecture of a client, an origin server and disjoint server mediated by a network in accordance with a preferred embodiment of the present invention.

With reference now to FIG. 3, a block diagram illustrates the relationship of one or more servers and a client that may implement the present invention. Therein is shown an origin server (sometimes called an originating server) 301, which may provide markup or other files. The markup may be 'rendered' in that a file containing markup language may be retrieved and transmitted, created on the fly and transmitted, or some combination of retrieving files and adding on-the-fly made markup. A rendering may occur such that a whole, well-formed markup file or stream is generated at the end of the process, or fragments of a well-formed markup file or stream is generated. The rendering commonly occurs upon receiving a request, which may be a HyperText Transfer Protocol (HTTP) request from a client 305. Though many elements of a rendered file or stream may be capable of display on a browser, some elements, such as comments, and occasionally executed program instructions, may not be displayed. Many aspects of rendering are under the program control of processor 202 of FIG. 2.

Origin server 301, client 305 and disjoint server 303 may implement many parts and even all parts of one or more data processing systems of FIG. 1. Origin server 301, client 305 and disjoint server 303 may be interconnected by a network, which is not pictured for simplicity's sake. Such a network may be robust and constant in providing connectivity services, such as via a private LAN. Such a network may be occasional and intermittent, such as may occur in a wi-fi or other wireless environment.

Generally, origin server 301 may provide an initial rendering of a portlet to client 305, wherein client 305 indicates to origin server 301 at least one portlet which the client would like to use later in a portal of the client's choosing, e.g. disjoint server 303 (sometimes called receiving server). Origin server 301 may create a shared session 307 which may be thought of as a file and can be stored in a non-volatile manner to a storage. Shared session 307 may be more ephemeral however, and may comprise nothing more than a stream of data output from server 301, and may take varying forms, depending on the location(s) it occupies during a transmission, i.e. it may be packetized and packet switched so that it exists in fragments across a network.

In addition, origin server 301 may be a cluster of servers that are within the same administrative domain. As such, the servers may share common databases or distribute such data among themselves. A transaction or protocol established with one of server in the cluster may be regarded as a transaction or protocol with the whole of the cluster. Likewise, the disjoint server may scale by having multiple servers coordinate handling within its own common administrative domain.

Shared session 307 may exist as a key or unique string that uniquely defines the combination of the client, the disjoint server and the portlet within origin server, in addition to state information for a portlet, which may be an object, to which the key refers.

Figure 4:
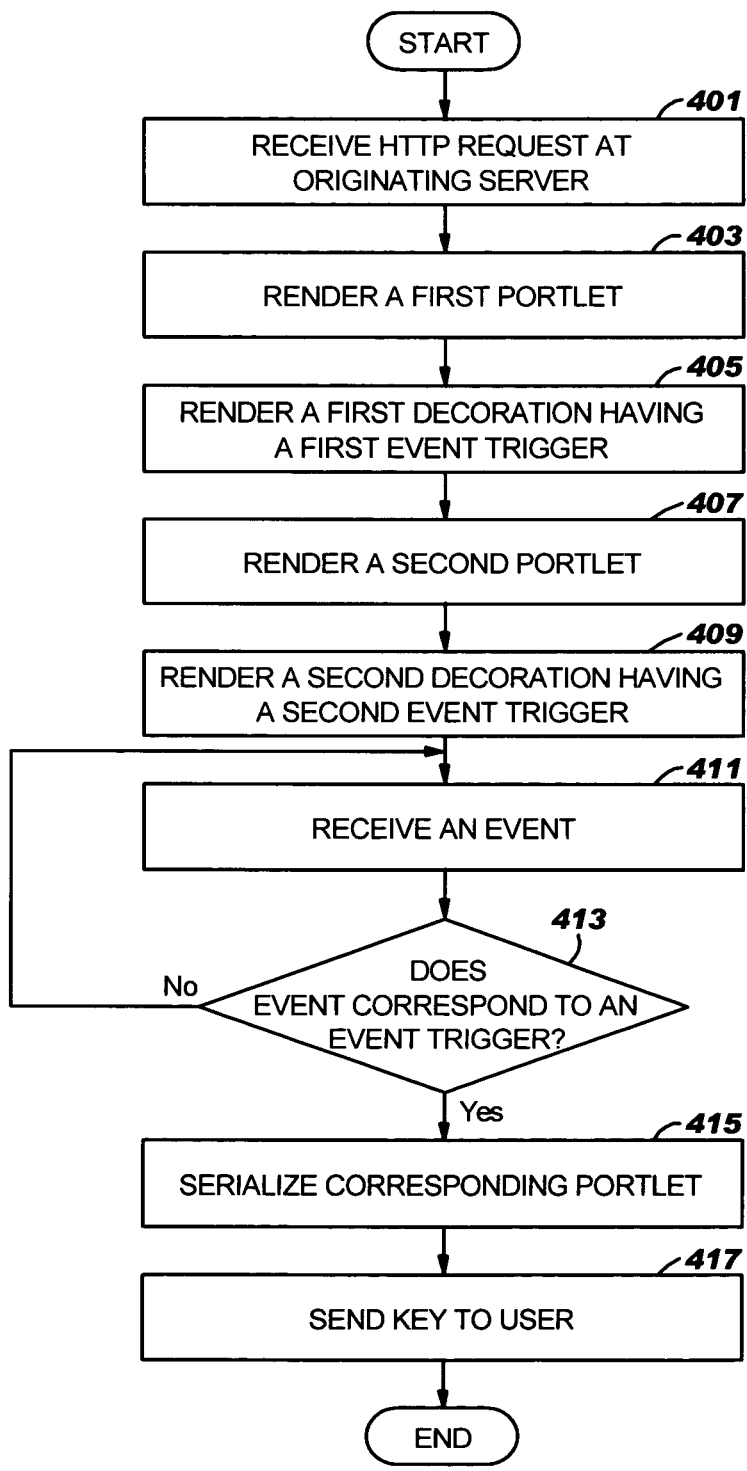
FIG. 4 is a flow chart showing steps performed on the origin server according to an embodiment of the invention.

FIG. 4 shows the steps that an origin server 301 of FIG. 3 may perform. A client 305 may make an HTTP request to the origin server 301. Origin server receives such a request (step 401), e.g. via network adapter 201 of FIG. 2, and may render a first portlet (step 403) by transmitting a markup file and possibly some code. The markup may be generated on-the-fly in whole or in part at origin server. In a session between origin server 301 and client 305, the origin server may also provide a first decoration (step 405) that is applicable to the first portlet, wherein the decoration is a button control, a window grab-bar or any other active decoration. The decoration may be coupled to a servlet or other program that accomplishes a dehydration of the portlet (described below) on the basis of an event trigger. Such event triggers may include the clicking of a pointer, e.g. a mouse, at a location denoted by coordinates in relation to a landmark in or around the portlet window.

Origin server may render a second portlet (step 407) accompanied by a second decoration (step 409). Like the first portlet, second portlet (step 407) may have code associated with it that awaits an event trigger given by a pointing device user-event, such as a mouse click.

Origin client may receive a user event (step 411), having a source at the client. If the user event corresponds to an event trigger (step 413) associated with one of the portlet decorations, then the origin server may invoke code of the portlet. Otherwise, the origin server may continue to wait to receive a user-event (step 411). If the code of the portlet is invoked, such code may dehydrate the portlet (step 415), e.g. by serializing the corresponding portlet to produce an object or other entity that may be stored in a shared session. Serialization is a process through which an object's state is transformed into some serial data format, such as XML or a binary format, in order to be stored for some later use. In other words, the object, e.g. a portlet, is "dehydrated" and put away until it is needed again.

The dehydrated object may comprise merely state data, e.g. portlet state. The portlet state and some reference, e.g. a fully qualified Uniform Resource Identifier (URI), may be stored in a key within, e.g. main memory 204 of FIG. 2. The key may then sent to the client (step 417) via a LAN adapter, which may be the network adapter 210 of FIG. 2.

The origin server of FIG. 3 may later receive occasional HTTP requests from a device using the state data, such state data perhaps containing a unique identifier of the session. To the extent that origin server can authenticate the session, the origin server may bill either the user of the session, or any intermediary, such as a disjoint server. Such a billing could be on the basis of per day of use, per hour of use or per HTTP request. Such a use could include the act of making an HTTP request to the origin server wherein the HTTP request carries with it the unique identifier.

The client itself may be manually directed by a user. The user, having a key locally, has great flexibility on what to do next. The key could be stored to memory for later use, it could be placed in a web page inside the client, or it could be sent via an XML HTTP session to the user's favorite portal. It is this third case that we explore next.

Figure 5:
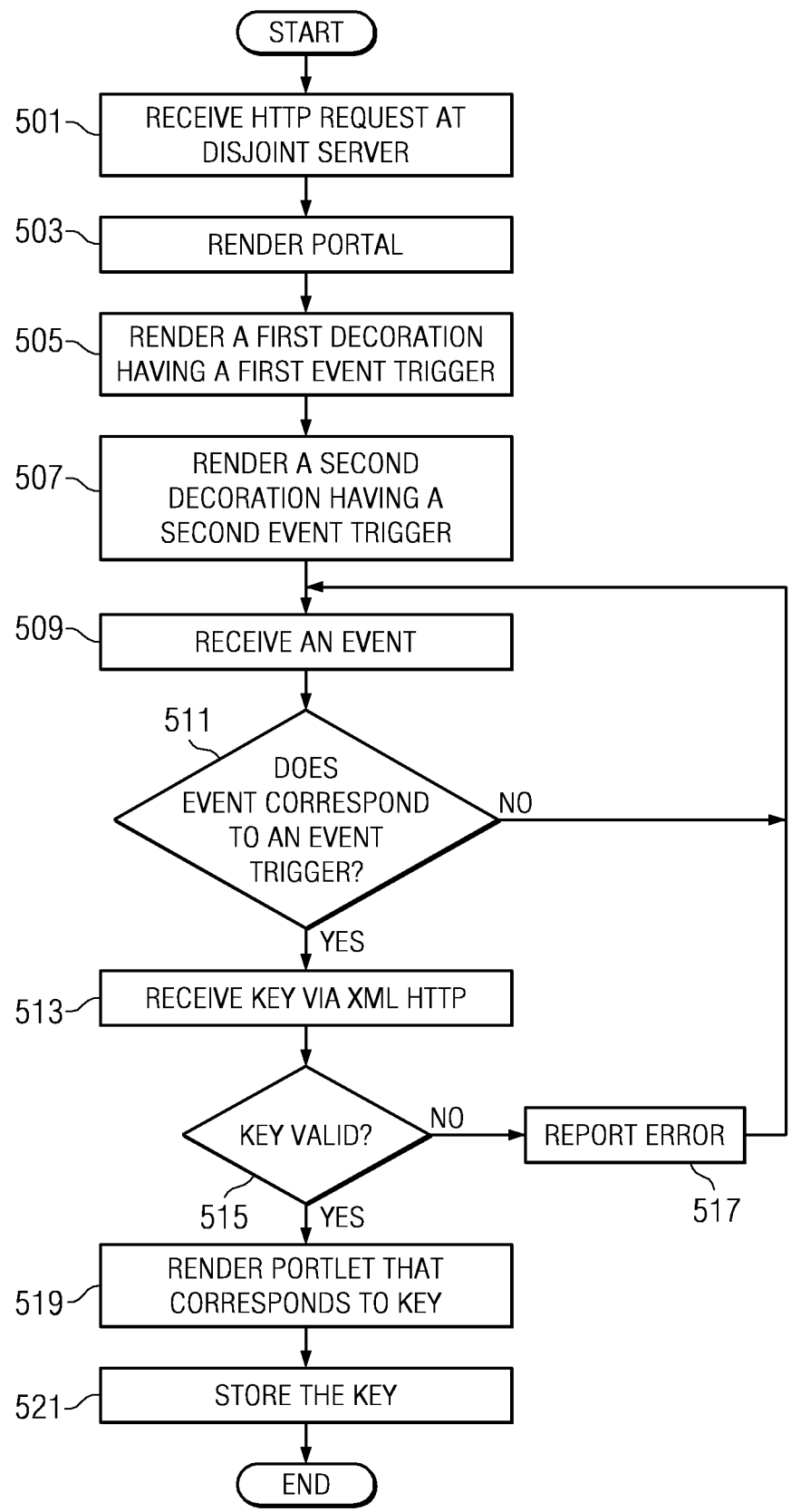
FIG. 5 is a flow chart showing steps performed on the disjoint server according to an embodiment of the invention.

FIG. 5 shows steps that may be performed by a second server, which may be different from the first origin server. In fact the second server may be in a different administrative domain from the first server, and thus be a disjoint server. For purposes of this embodiment, this server shall be called a disjoint server, however, it is appreciated that the second server may be the same server as the origin server.

Disjoint server may receive a HTTP request from the client (step 501). The disjoint server may have an account with user preferences and configuration already established for the client. Authentication may be optional, especially when a new account is being created at disjoint server. Disjoint server may provide what is conventionally regarded as a portal. Disjoint server may provide or render, e.g. when a user initially establishes an account, a portal that is sparse and is rendered (step 503) with little ornamentation. The portal may consist of very little content except that it may provide some way to detect a user event and its relative location within a rendered window that is the portal window. In this minimalist view, a first decoration having a first event trigger may be rendered (step 505) and a second decoration having a second user-event trigger may be rendered (step 507). Such decorations may occupy different areas within the portal window, and thus offer a way for the user to signal a preference for where, within the portal window, a particular portlet should be configured to appear.

Though the first decoration may be responsive to mouse clicks within an area of a displayed portal. It is appreciated that the area is a virtual area, and for reasons of small display size, may extend beyond the edges of a display, a window, or both.

The disjoint server may receive a user event (step 509). In some cases the user event will not relate (step 511) to a user-event trigger that is associated with the first decoration or the second decoration, and thus a loop to continue waiting for an event is taken in the flow. Otherwise, a user-event will correspond to a user-event trigger of the decorations (step 511).

The event-trigger then causes code within the disjoint portal to examine or receive (step 513) the key previously obtained and rehydrate it, i.e. get the portlet object from its location at the origin server and apply the state of the key to it. The step of applying the state of the key to the portlet includes executing at least one of the methods or steps stored in the portlet. The key may pass some validity tests (step 515), such as authentication of the user, or availability of necessary web resources (as these might not be available in case the ISP suffers a fault, or the origin host has some kind of DOS attack). If the yes branch of validity test (step 515) occurs, then the disjoint server may render the portlet (step 519) that corresponds to the key in the relative position of the portal window that corresponds with the position of the decoration that was the target of the user-event.

Following rendering the portlet in a relative position (e.g. as given by coordinates of mouse at the time of mouse click or release), disjoint server may store (step 521) the key in a data structure that recalls the portlet state, and the portlet's relative coordinates within the portal window. The portal may modify the presentation of the portlet window by preferences earlier selected by the user, such as color, font and other aesthetic choices so that the portlet is persistently shown in the same general manner in subsequent HTTP requests to the portal (URI).

Failure for the key to be valid (for whatever reason) at validity test (step 515), may cause the disjoint server to send an error report (step 517) and continue to wait for a user event (step 509). In addition, the step of receiving a key via XML HTTP (step 513) may also include the portal requesting a key.

The disjoint server may bill for the privileges of aggregating a collection of portlets for the user. Billing may be established per portlet that the user places on the disjoint server.

An embodiment of the invention may rely on Java and related programming languages, and may rely on a JVM to accomplish certain functions.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method to selectively move a portlet among portals, the portlet having a portlet state including portlet session information, comprising the steps of:

receiving Hypertext Transfer Protocol (HTTP) request at an originating server from a client;

rendering a portlet by the originating server in a first portal at the client responsive to receiving the HTTP request, the portlet having a decoration provided by the originating server and an event trigger associated with the decoration, the decoration coupled to a servlet;

receiving a first user event at the originating server, the first user event corresponding to the event trigger, wherein receiving the first user event comprises receiving a drag indication, and wherein receiving the drag indication comprises receiving the drag indication at coordinates within a portlet window;

receiving a second user event at the originating server that includes a drop indication, wherein receiving the second user event at the originating server includes receiving a pointer action;

serializing the portlet state based on the first user event at the originating server, performed by the servlet;

storing the portlet state in a key at the originating server by the servlet, wherein storing the portlet state includes storing a uniform resource identifier in the key; and sending the key having the portlet state to the client from the originating server, wherein the key is configured to allow a disjoint server to render the portlet in a second portal rendered at the client and provided by the disjoint server to the client, the disjoint server operating in a different administrative domain than the originating server;

wherein the first and second portals are displayed in first and second browser windows at the client.

2. An originating server for selecting a portlet, the portlet having a portlet state including portlet session information, comprising:

a processor for rendering the portlet in a first portal in a first browser window at a client, the portlet having a decoration and an event trigger associated with the decoration, the decoration provided by the originating server and coupled to a servlet;

a network adapter at the originating server for receiving a first user event at the originating server, the first user even corresponding to the event trigger, the network adapter coupled to the processor, wherein the network adapter comprises means for receiving a drag indication, and wherein the means for receiving the drag indication comprises means for receiving the drag indication at coordinates within a portlet window;

the network adapter receives a second user event at the originating server that includes a drop indication, wherein the second user event includes a pointer action indicating the drop indication at a second portal provided by a disjoint server;

a means for serializing the portlet state at the originating server by the servlet based on the first user event, the means to serialize coupled to the processor;

a memory to store the portlet state in a key at the originating server, wherein the memory stores a uniform resource identifier in the key, and wherein the key is configured to allow the disjoint server to render the portlet in the second portal in a second browser window at the client, the disjoint server operating in a different administrative domain from the originating server;

a LAN adapter to send the key having the portlet state to a client; and a means for billing the client operatively coupled to the processor.

3. A method of transferring a portlet from a first portal rendered at a client, the first portal provided by an origin server, to a second portal rendered at the client, the second portal provided by a disjoint server operating in a different administrative domain from the origin server, comprising:

rendering, at the client, the first portal in a first browser window on a display of the client in response to portal code received from the origin server;

rendering, at the client, the portlet in the first portal, including a decoration on the portlet provided by the origin server, the decoration having an event trigger;

rendering, at the client, the second portal in a second browser window on the display;

detecting a first event at the decoration via the event trigger, the event being an input associated with the decoration from a user of the client;

in response to detecting the event, transmitting a request to the origin server;

receiving from the origin server at the client a key, the key containing state information of the portlet including a portlet session identifier and identification of the client, the origin server, and the disjoint server;

detecting in the second portal a second event;

in response to detecting the second event, transmitting the key to the disjoint server; and receiving portlet code for the portlet from the disjoint server for rendering the portlet in the second portal, whereupon the portlet is rendered in the second portal with the state information.

4. The method of claim 3, wherein the key contains the state information in serialized form.

5. The method of claim 3, wherein the key contains authentication information allowing the disjoint server to authenticate the portlet with the origin server.

6. The method of claim 3, wherein the first and second events comprise a drag and drop operation.

7. The method of claim 3, wherein the key further includes a uniform resource identifier of the origin server.

8. The method of claim 3, wherein the key further includes billing information.

* * * * *